United States Patent
Smache et al.

(10) Patent No.: US 11,917,046 B2
(45) Date of Patent: Feb. 27, 2024

(54) METHOD OF SYNCHRONIZING NODES IN A DETERMINIST MESH NETWORK

(71) Applicant: COMMISSARIAT A L'ENERGIE ATOMIQUE ET AUX ENERGIES ALTERNATIVES, Paris (FR)

(72) Inventors: Meriem Smache, Grenoble (FR); Thibault Franco Rondisson, Grenoble (FR); Alexis Olivereau, Grenoble (FR); Assia Tria, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 320 days.

(21) Appl. No.: 17/182,450

(22) Filed: Feb. 23, 2021

(65) Prior Publication Data

US 2021/0306130 A1  Sep. 30, 2021

(30) Foreign Application Priority Data

Feb. 25, 2020 (FR) ...................................... 20 01841

(51) Int. Cl.
*H04W 56/00* (2009.01)
*H04L 7/00* (2006.01)
*H04J 3/06* (2006.01)

(52) U.S. Cl.
CPC ........... *H04L 7/005* (2013.01); *H04W 56/001* (2013.01); *H04J 3/0658* (2013.01); *H04L 7/0037* (2013.01)

(58) Field of Classification Search
CPC ............. H04W 56/001–56/002; H04J 3/0635–3/0697; H04L 7/005; H04L 7/0037; Y02D 30/70
See application file for complete search history.

(56) References Cited

U.S. PATENT DOCUMENTS

| 2009/0323669 | A1* | 12/2009 | Salonidis | ............. | H04J 3/0655 370/350 |
| 2013/0201967 | A1* | 8/2013 | Nentwig | ............... | H04W 56/00 370/336 |

(Continued)

FOREIGN PATENT DOCUMENTS

CN  105704808 B  1/2019
CN  110545153 B  * 10/2020

(Continued)

OTHER PUBLICATIONS

Shen et al., machine translation of CN 110545153 B1 published on Oct. 27, 2020, retrieved from https://worldwide.espacenet.com on Aug. 11, 2023, 8 pages. (Year: 2023).*

(Continued)

*Primary Examiner* — Robert M Morlan
(74) *Attorney, Agent, or Firm* — Oblon, McClelland, Maier & Neustadt, L.L.P.

(57) ABSTRACT

The present invention relates to a method for synchronising a node in a deterministic mesh network, in particular a network of sensors using a channel hopping (TSCH) transmission medium access mode. Each node measures the successive synchronisation offsets of its local clock in relation to those of neighbour nodes with which it enters into communication, the measurement being carried out by detecting a reception event of a packet transmitted by the neighbour node or an acknowledgement of a packet transmitted by said node to the neighbour node. The node estimates from these synchronisation offsets, a synchronisation offset for the timeslot and corrects its local clock by a fraction of the synchronisation offset thus estimated. Said fraction may be determined by means of multi-agent reinforcement learning (MARL), each agent being associated with a node of the network.

9 Claims, 3 Drawing Sheets

(56) References Cited

U.S. PATENT DOCUMENTS

2016/0037449 A1\* 2/2016 Kandhalu Raghu .. H04W 48/00
370/311
2020/0162181 A1\* 5/2020 Tang ..................... H04J 3/0664

FOREIGN PATENT DOCUMENTS

WO     WO 2007/005148 A2    1/2007
WO     WO 2008/033514 A2    3/2008

OTHER PUBLICATIONS

French Preliminary Search Report dated Nov. 10, 2020 in French Application 20 01841 filed Feb. 25, 2020 (with English Translation of Categories of Cited documents), 2 pages.
Yang, W. et al., Enhanced secure time synchronisation protocol for IEEE802.15.4e-based industrial Internet of Things, IET Information Security, vol. 11, No. 6, Nov. 1, 2017, XP006063804, 8 pages.
Sutton, R. S. et al., "Reinforcement learning: An Introduction," 2nd edition, Jan. 1, 2018, 30 pages.

\* cited by examiner

FIG.1

PRIOR ART

FIG.2

PRIOR ART

METHOD OF SYNCHRONIZING NODES IN A DETERMINIST MESH NETWORK

TECHNICAL FIELD

The present invention generally relates to the field of wireless mesh networks, in particular Wireless Sensor Networks (WSN) in accordance with the standard IEEE 802.15.4 and more specifically its IEEE 802.15.4e version. In particular, it is applicable in the field of the Industrial Internet of Things (IIoT).

PRIOR ART

Wireless Sensor Networks (WSN) are increasingly used in the field of industrial infrastructures, in particular for applications requiring a real-time critical information control. When these networks are connected to the Internet via a gateway, we generally speak of Industrial Internet of Things (IIoT). The IIoT relates to sectors as varied as those of energy generation (for example nuclear power plants), supply (water, fuels, gas, energy), communications (for example between drones), monitoring of civilian infrastructures (bridges, roads, pipelines), etc. Use cases of the IIoT generally associate a complex industrial infrastructure, a deterministic transfer of critical data and a real-time management of the control process. Deterministic transfer of data, conventionally means a guaranteed routing of these data under a predetermined latency constraint. Furthermore, since the nodes are generally autonomous in energy, their consumption must be the lowest possible.

Specific communication protocols have been proposed to meet the strict constraints in terms of service quality of the IIoT networks, and more particularly those relating to the determinism, to the reliability and to the energy consumption. Thus, the standard IEEE 802.15.4 relating to the physical layer of WSN networks was completed at data link level by a standard IEEE 802.15.4e concerning the medium access control (MAC) layer. Various protocol stacks may subsequently be provided on top of the MAC layer standardised by IEEE 802.15.4e depending on the type of application considered.

The standard IEEE 802.15.4e uses an access control, known as Time Synchronised Channel Hopping (TSCH). This type of access control makes it possible to obtain a low energy consumption (low-duty cycle) whilst guaranteeing a high reliability. More specifically, the access of the nodes to the medium is split into slotframes, each slotframe itself being split into timeslots, the access of the nodes during a timeslot being performed by frequency division. Thus, a node may be allocated a channel (in the case of a frequency), in order to communicate in transmission or in reception with another node, during a timeslot within a slotframe. The scheduling of channels within a slotframe repeats according to a schema repeating cyclically with the repetition frequency of the slotframes.

The communications between nodes of the network do not interfere insofar as these use distinct frequencies during the same timeslot. Furthermore, the frequency hopping from one frame to the other makes it possible for the network to be more robust to channel fading as well as to interferences related to multiple paths.

Figure 1:
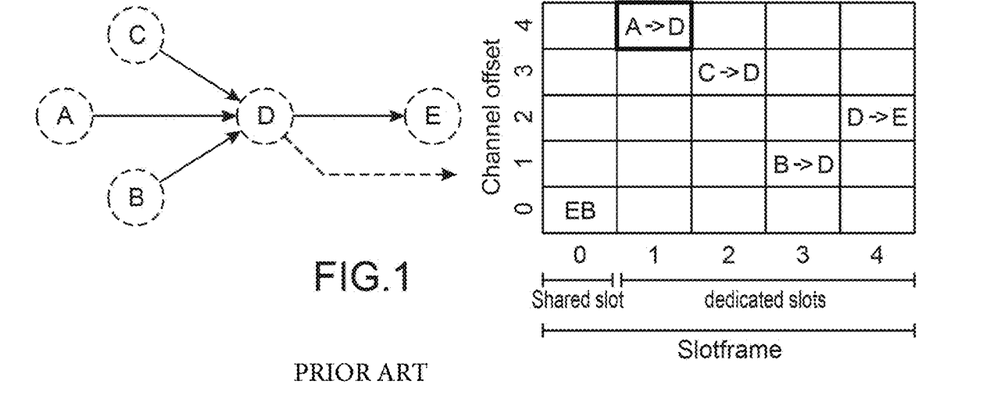
FIG. 1 schematically shows an example of transmission scheduling between nodes of a WSN network using the TSCH protocol.

FIG. 1 schematically illustrates an example of transmission scheduling between nodes of a WSN network using a TSCH-type access control.

The various nodes of the network are designated A, B, C, D, E and a scheduling diagram of the transmissions between these nodes during a slotframe is shown to the right of the figure. The transmissions are programmed according to a scheduling matrix whereof the rows correspond to the various channels and the columns to the timeslots of the slotframe. Thus, in the example shown, the node A transmits a data packet to the node D during the timeslot of index 1, the node C transmits a data packet to the node D during the timeslot of index 2, and so on. Pairs of distinct nodes may communicate on distinct channels during the same timeslot.

Figure 2:
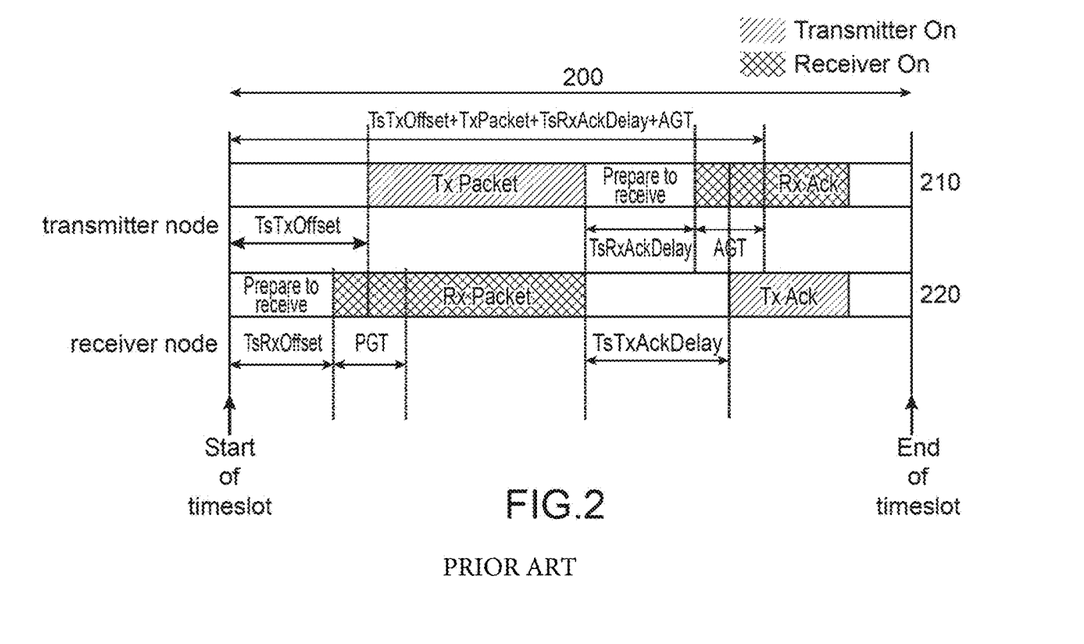
FIG. 2 shows an example of timing chart for transmitting and receiving a packet for two nodes of a WSN network using the TSCH protocol.

FIG. 2 shows an example of timing chart for transmitting and receiving a packet for two nodes of a WSN network using the TSCH protocol.

This timing chart relates to the transmission of a packet from a first node (transmitter node) to a second node (receiver node) during a timeslot, 200, of a slotframe. The row 210 relates to the transmitter node and the row 220 to the receiver node.

The transmission of the data packet occurs after a first timing offset TsTxOffset from the start of the timeslot, 200. During this first timing offset, the transmitter of the first node prepares the data packet to be sent and configures the radio circuit depending on the frequency programmed in the scheduling matrix. After this timing offset, the transmitter wakes up the radio circuit and transmits the packet in question. After having transmitted the last byte of the packet, the first node switches to standby mode and waits for the acknowledgement from the second node.

Similarly, the second node configures, during a second timing offset, TsRxOffset, the radio circuit of its receiver depending on the frequency programmed in the scheduling matrix. At the end of this offset, the receiver of the second node wakes up its radio circuit and is ready to receive the data packet from the first node. If a guard time, designated by PGT (Packet Guard Time), starting at the end of TsRxOffset, elapses without the second node having started to receive data of the packet transmitted by the first node, the receiver turns off its radio circuit for the remainder of the timeslot 200. On the other hand, if it has started to receive a packet during the guard time PGT, the second node waits for a time TsTxAckDelay after the end of the receipt of the packet in order to transmit an acknowledgement, TxAck.

After the end of the transmission of the first packet, the first node accords the second node a certain time, TsRxAckDelay, in order to enable it to prepare the acknowledgement. If a guard time, designated by AGT (Acknowledgement Guard Time), starting at the end of TsRxAckDelay, elapses without the transmitter node having received an acknowledgement, it considers that the transmission has failed and turns off its radio circuit. Thus, it is understood that the guard times PGT and AGT are nominal time windows during which a node waits for an action of a neighbour node with which it is in communication. The absence of detection of the expected action during this nominal time window leads to the switching to standby mode of the node until the end of the current timeslot.

From the scheduling matrix, values of the timing offsets TsTxOffset, TsRxOffset, and durations of the guard times PGT, AGT (this information being assumed known by all of the nodes), each node of the network knows precisely when it must transmit or receive and on which channel. Thus, the behaviour of the network is perfectly deterministic and the latency between a source node and a destination node of the network in a multi-bond transmission schema is limited.

The TSCH protocol assumes that the various nodes of the network are synchronous. This synchronisation is necessary insofar as the local clocks may drift in relation to one another. The synchronisation is performed point to point during a communication between two points of the network or even by providing a periodic transmission of synchronisation packets in the network.

As indicated in FIG. 2, the Start Frame Delimiter (SFD) is transmitted by the transmitter node a time TsTxOffset after the start of the transmission slot. The receiver node may then timestamp with its local clock the reception event of the start frame delimiter. We will note R1 the time thus measured by the local clock of the receiver node. As seen above, at the end of the receipt of the packet, the receiver node waits for a time TsTxAckDelay in order to transmit its acknowledgement. The transmitter node may then timestamp with its local clock the reception event of the acknowledgement. We will note R2 the time thus measured by the local clock of the transmitter node.

Two cases are to be distinguished depending on whether the transmitter node or the receiver node serves as time reference. If this concerns the transmitter node, the receiver node may synchronise from R1 and TsTxOffset. On the other hand, if this concerns the receiver node, the transmitter node may synchronise from R2, TsTxOffset, TsTxAckDelay, and from the duration of the packet that it has transmitted.

Thus, each node of the network may correct the relative drift of its local clock during a point-to-point communication.

This method of synchronisation between nodes may however be disrupted by a malicious node, as described in the article by W. Yang et al. entitled "Enhanced secure time synchronisation protocol for IEEE 802.15.4e-based industrial Internet of Things, published in IET Information Security. 2017, Vol. 11, No. 6, pp. 369-376.

Indeed, according to a timeslot template attack schema, a malicious node may desynchronise the one with which it communicates by voluntarily delaying (or advancing) the time at which it must transmit its data packet or even by delaying (or advancing) the time at which it must transmit its acknowledgement.

Figure 3:
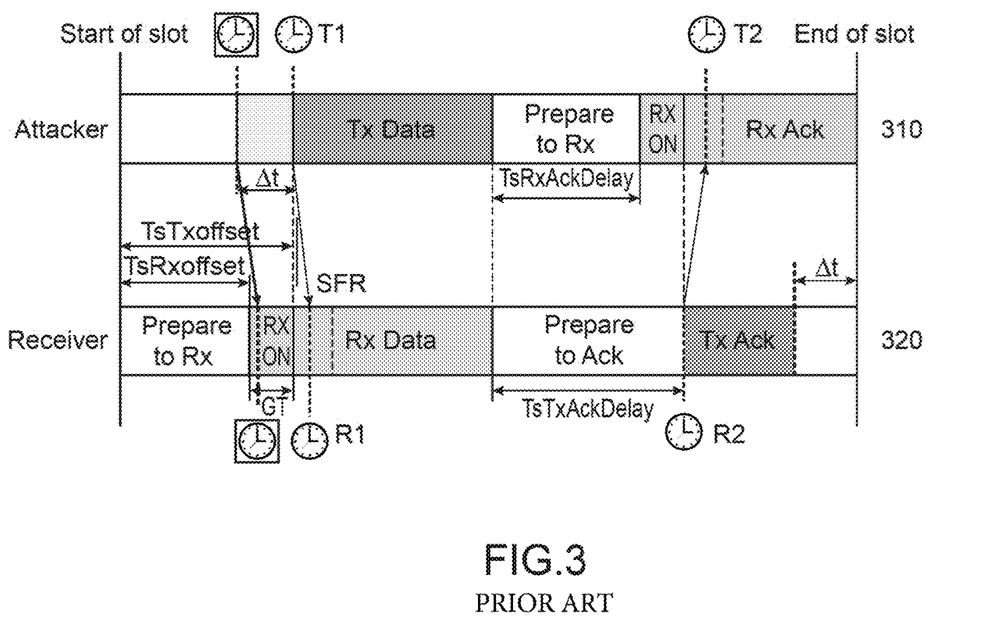
FIG. 3 shows an example of timeslot template attack in a WSN network using the TSCH protocol.

FIG. 3 shows an example of timeslot template attack in a WSN network using the TSCH protocol.

As seen in FIG. 2 the timing chart relates to the transmission of a packet from a transmitter node 310 to a receiver node 320 during a timeslot of a slotframe. In the example illustrated, the attacker is the transmitter node. It advances the transmission time of its start frame delimiter (SFD) by a time $\Delta t$ in relation to the setpoint time, namely $T_0^i$+TsTxOffset where $T_0^i$ is the start of the timeslot. In other words, the SFD transmission time is $T_0^i$+TsTxOffset−$\Delta t$.

If this time falls during the guard time PGT, the receipt of the packet is considered as valid and the receiver node sets its local clock so as to make the measurement of this time coincide with the expected value i.e. $T_0^i$+TsTxOffset (by ignoring the propagation time). The result is that for the receiver node, the timeslot ends at a time occurring $\Delta t$ earlier than expected. Everything happens as if the following transmission slot in the scheduling matrix was offset by −$\Delta t$.

Of course, the situation would be symmetrical if the receiver node was the attacker and would advance by $\Delta t$ the transmission time of the acknowledgement.

This desynchronisation subsequently propagates little by little to the entire network. The result is an offset of the transmissions from the nodes in relation to the times provided in the scheduling matrix, then a chaotic distribution of these transmissions leading to collisions of packets and to the loss of the determinism of the network. The consequences of such a timeslot template attack may be particularly severe with regard to the real-time character of the applications considered. From that moment on, it is important to be able to detect such an attack early enough and, if applicable, provide corrective measures.

The solutions proposed in the prior art generally consist in observing, for a node, the reception times of the successive messages transmitted by its neighbour nodes and in deducing therefrom an estimation of the reception time of the next message transmitted by one of these nodes. If the time difference in the reception time thus estimated and the effective reception time of this message exceeds in absolute value a predetermined tolerance threshold, a timeslot template attack is detected and the neighbour node is no longer taken into account for the synchronisation or even is eliminated from the network.

The solution proposed in the aforementioned article consists in recording the reception times of the successive messages (measured with the local clock of the reception node) as well as the transmission times of these messages (measured with the local clock of the transmission node, assumed to be a time reference) and in deducing therefrom the drift parameters of the clock of the reception node in relation to the clock of the transmission node. It is then possible to deduce from the reception time of a packet the time at which it had been transmitted. If the time difference between the transmission time thus estimated and the time at which it would have to be transmitted is greater in absolute value than a predetermined tolerance threshold, an attack is detected and the transmission node is excluded as time reference.

Generally, the aforementioned proposals are not satisfactory in practice. Indeed, a single tolerance threshold cannot be provided and must be calculated for each node, which becomes particularly restrictive when the network is dynamic, that is to say when the network changes topology over time (mobile nodes and/or incoming or outgoing nodes of the network).

Furthermore, they sometimes assume the existence of a master node serving as single time reference for the other nodes of the network. Yet, most of the WSN networks have a distributed organisation and a mesh topology, without master node.

Finally, although the aforementioned proposals aim to detect a timeslot template attack, they do not however make it possible to correct the synchronisation error induced by this attack. The exclusion of the node having caused the desynchronisation may occur too late, or even be insufficient for re-establishing the synchronisation of the network.

One object of the present invention is consequently to remedy the aforementioned drawbacks and more specifically to propose a method for synchronising a node in a deterministic mesh network, such as a WSN network using an access control according to the TSCH mode, which functions in an entirely distributed architecture, does not require a complex calculation of the desynchronisation threshold and enables a rapid correction in the event of timeslot template attack.

DESCRIPTION OF THE INVENTION

The present invention is defined by a method for synchronising a node in a deterministic mesh network, the access of the nodes of the network to the transmission medium being programmed according to a slotframe split into timeslots, said node being able to communicate with its neighbour nodes during timeslots of the slotframe by using transmission resources, said node being provided with a local clock and measuring the synchronisation offsets of this clock in relation to the local clock of at least one neighbour node by detecting a reception event of a packet transmitted by the neighbour node or of an acknowledgement of a packet transmitted by said node to the neighbour node, said method being original in that said node estimates, from at least one synchronisation offset thus measured, a future synchronisation offset of the local clock for a timeslot following the one for which the last measurement was carried out and corrects its local clock by a correction value equal to a fraction of the synchronisation offset thus estimated.

Advantageously, the synchronisation offset measured is not taken into account for the correction if it is greater than a first predetermined threshold value.

Typically, the fraction of the offset is less than half of the estimated synchronisation offset.

When said correction value is greater in absolute value than a second predetermined threshold value, a synchronisation fault may be signalled.

Preferably, the node estimates a future synchronisation offset of its local clock from a plurality N of synchronisation offsets, measured during past timeslots and the current timeslot, the node being in communication with one of its neighbour nodes during the past timeslots and the current timeslot.

The node may estimate the future synchronisation offset by carrying out a linear regression on the N synchronisation offsets, measured during past timeslots and the current timeslot.

According to a first variant, the node records in a FIFO stack the (N−1) synchronisation offsets measured during past timeslots, independently of the neighbour node with which said communication was established.

According to a second variant, the node records in a plurality of FIFO stacks the synchronisation offsets measured during past timeslots, each stack being associated with a neighbour node and only storing the synchronisation offsets in relation to the neighbour node with which it is associated.

The fraction of the estimated synchronisation offset may be obtained by means of multi-agent reinforcement learning (MARL), each agent being associated with a node of the network.

In a typical case of application, the network of nodes possesses a physical layer in accordance with the standard IEEE 802.15.4, a data link layer in accordance with the standard IEEE 802.15.4e, the access control of the nodes to the transmission medium being performed in TSCH mode.

BRIEF DESCRIPTION OF THE DRAWINGS

Other features and advantages of the invention will become apparent upon reading a preferable embodiment of the invention, described with reference to the appended figures, wherein.

DETAILED DESCRIPTION OF SPECIFIC EMBODIMENTS

It will subsequently be considered a deterministic mesh network within the meaning of the foregoing, of fixed or dynamic topology. The network is meshed and each node may enter into communication with its neighbours, in transmission or in reception. Furthermore, it is assumed that the medium access of the various nodes is programmed according to slotframes, each slotframe itself being split into timeslots, the access of the nodes during a timeslot using distinct transmission channels so as to prevent the collisions of packets between various communications. The transmission resources used by the various channels during a timeslot may in particular be frequencies, multiplex subcarrier chunks OFDM, orthogonal codes, or even a combination of the preceding resources. The access control of the various nodes is programmed during each slotframe by a scheduling matrix whereof one of the dimensions (hereafter the columns) corresponds to the timeslots and the other dimension (hereafter the rows) corresponds to the transmission resources in question.

A typical case of application of the present invention is that of a network of sensors (WSN network) whereof the physical layers (PHY) and data link layers (MAC) are respectively in accordance with the standards IEEE 802.15.4 and IEEE 802.15.4e and whereof the medium access control is carried out by channel hopping according to the TSCH mode as described in the introductory part. The TSCH mode may be used within the scope of a plurality of protocol stacks, for example in 6tiSCH (IPv6 on TSCH mode), 6LoWPAN, WirelessHART (Highway Addressable Remote Transducer), Wi-SUN (Smart Ubiquitous Networks) networks, etc.

We will subsequently consider a pair of nodes of the network in question, namely a transmitter node and a receiver node in communication with one another during a given timeslot $A^i = [T_0^i, T_0^{i+1}]$, corresponding to the $i^{th}$ column of the scheduling matrix. The transmitter node and the receiver node use the transmission resource specified in the scheduling matrix during the timeslot, $A^i$.

Figure 4:
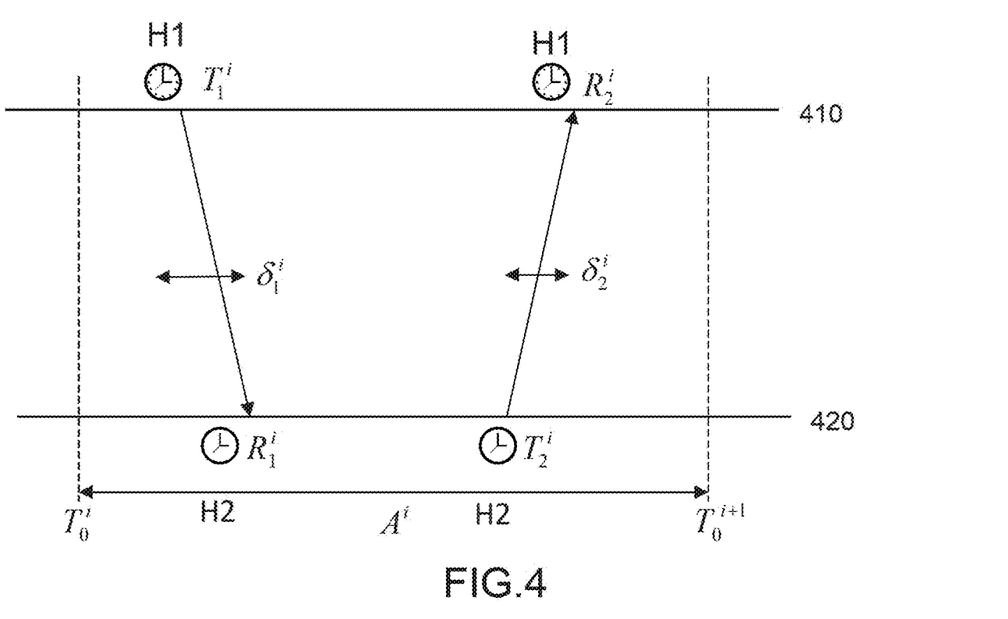
FIG. 4 schematically shows time offsets measured by a node in order to synchronise according to the synchronisation method of the invention.

As illustrated in the timing chart of FIG. 4, the transmitter node 410 transmits a packet on this resource at the time $T_1^i = T_0^i + TsTxOffset$, measured by its local clock H1. More specifically, the start frame delimiter (SFD) leaves the transmitter node at this time, such as measured by H1. The packet (that is to say its delimiter SFD) is received by the receiver node at the time $R_1^i$, such as measured by its local clock, H2. The receiver node deduces therefrom a first synchronisation offset $\delta_1^i = R_1^i - (T_0^i + TsTxOffset)$, it being understood that the values $T_0^i, TsTxOffset$ are known of all of the nodes of the network and that $(T_0^i + TsTxOffset)$ is measured by means of the local clock of the receiver node.

At the end of the receipt of the packet (that is to say on receipt of the end frame delimiter), the receiver node waits for a time TsTxAckDelay and sends an acknowledgement back to the transmitter node, during a time $T_1^i$, such as measured by its local clock, H2. The acknowledgement is received by the transmitter node at the time $R_2^i$, such as measured by its local clock, H1. The transmitter node deduces therefrom a second synchronisation offset $\delta_2^i = R_2^i - T_2^i = R_2^i - (T_0^i + TsTxOffset + Tpacket + TsTxAckDelay)$, it being understood that the value TsTxAckDelay is known by all of the nodes of the network and that, by definition, the duration of the packet, Tpacket, is known by the transmitter node. The time $T_2^i = (T_0^i + \text{TsTxOffset} + \text{Tpacket} + \text{TsTxAckDelay})$ is measured by means of the local clock of the transmitter node, H1.

At the end of this exchange, the receiver node disposes a first synchronisation offset, $\delta_1^i$, and the transmitter node disposes a second synchronisation offset, $\delta_2^i$.

Subsequently, we will note in a generic manner, $\delta^i$, in order to indifferently designate the first (or the second) synchronisation offset, $\delta_1^i$ ($\delta_2^i$), measured by a node during the timeslot $A^i$.

This synchronisation offset calculation is repeated for all of the access slots during which a node is in communication (in transmission or in reception).

In the aim of simplifying the presentation and without loss of generality, we will assume that the timeslots during which the node is in communication are consecutive and will note $i-N+1, \ldots, i-2, i-1, i$, the indexes of these slots, with $N \geq 1$. The synchronisation offsets successively measured by the node are respectively noted $\delta^{i-N+1}, \ldots, \delta^{i-2}, \delta^{i-1}, \delta^i$. From these synchronisation offsets thus measured, the node estimates its next synchronisation offset, i.e. S', and carries out a synchronisation correction of a time $\eta \hat{\delta}^{i+1}$, with a catch-up factor $\eta$, $0 < \eta \leq 1/2$, before the start of the following access slot.

Thus, it is understood that if the local clock of the node delays in relation to the local clock of the node with which it is in communication, this clock must be advanced by $\eta |\hat{\delta}^{i+1}|$. Inversely, if the local clock of the node advances in relation to the local clock of the node with which it is in communication, this clock must be delayed by $\eta |\hat{\delta}^{i+1}|$.

If it is now designated by $N_1$ and $N_2$ the two nodes in communication during the timeslot $A^i$, and that it is noted respectively $\hat{\delta}_{N_1}^{i+1}$ and $\hat{\delta}_{N_2}^{i+1}$ the next synchronisation offsets estimated by these nodes, the node $N_1$ will apply a synchronisation correction $\eta \hat{\delta}_{N_1}^{i+1}$ and the node $N_2$ will apply a synchronisation correction $\eta \hat{\delta}_{N_2}^{i+1}$, such that the relative synchronisation deviation will be reduced by $\eta |\hat{\delta}_{N_2}^{i+1} - \hat{\delta}_{N_1}^{i+1}| \eta \Delta_{N_1,N_2}^i$ where $\Delta_{N_1,N_2}^i$ is the offset (in absolute value) between the local clocks of the nodes $N_1$ and $N_2$, measured during the timeslot $A^i$.

Thus, the correction will be carried out equally between the transmission node and the reception node. The selection of $\eta=1/2$ corresponds to the case where an attempt is made to cancel in one go the offset between the two local clocks for the following timeslot. However, it may be preferred to carry out this compensation progressively, by taking a lower value of $\eta$, for example $\eta=1/p$ with $p>2$ or also $\eta=2^{-M}$ with $M \geq 1$.

It is important to note that the synchronisation corrections are performed in a distributed manner without reference nodes. The local clocks of the various nodes synchronise progressively little by little as communications between the nodes are established. The catch-up factor $\eta$ makes it possible to control the convergence speed of the synchronisation of the network, a low value of this factor in particular making it possible to prevent an unstable or oscillatory state.

In practice, each node records in a FIFO stack of size $N-1$ the synchronisation offsets that it has successively measured during $N-1$ previous communications.

Thus, still in the hypothesis where these communications took place during consecutive timeslots, the values $\delta^{i-N+1}, \ldots, \delta^{i-2}, \delta^{i-1}$ are stored in the stack. These values as well as the value measured during the current chunk, $A^i$ serve to estimate the synchronisation offset during the following chunk $A^{i+1}$ and, as already described, to carry out a synchronisation correction of $\eta \hat{\delta}^{i+1}$ the local clock. The current value measured, $\delta^i$, is then stored in the stack and the oldest value $\delta^{i-N+1}$ is unstacked.

Generally, when the communications of the node took place during the access slots, $A^{i-k_{N-1}}, \ldots, A^{i-k_2}, A^{i-k_1}$ where $i-k_N, \ldots, i-k_2, i-k_1$ are the indexes of N−1, last access slots during which the node in question has transmitted or received a packet from a third-party node, the offset values $\delta^{i-k_{N-1}}, \ldots, \delta^{i-k_2}, \delta^{i-k_1}$ are stored in the stack. An estimation of the synchronisation offset during the timeslot $A^{i+1}$, that is to say $\hat{\delta}^{i+1}$, is obtained from offset values stored in the stack and the one measured during the current timeslot. The offset correction is performed before the start of the chunk $A^{i+1}$, Alternatively, the correction may be performed later, but however before the next communication of the node.

Advantageously, in addition to the synchronisation offset values, the node may also store the indexes of the timeslots during which they were measured. Indeed, in the forecast $\hat{\delta}^{i+1}$, it is understood that an offset measurement is all the less taken into account if it is older.

Generally, various forecasting methods may be used to forecast $\hat{\delta}^{i+1}$. In particular, an autoregressive forecasting model, a Bayesian filtering in a manner known by the person skilled in the art may be used. Other forecasting models may be considered without departing from the scope of the present invention.

According to an important alternative embodiment, the synchronisation correction is only applied insofar as this correction is lower in absolute value than a predetermined threshold, i.e. $\eta |\hat{\delta}^{i+1}| < \delta_{max}$. Failing this, it will be concluded a default case. Such a default case may in particular occur when a node of the network is subjected to a timeslot template attack or that its clock is deficient. In the case of a WSN network using an access control according to the TDSCH mode, it will advantageously be selected $$\delta \frac{1}{2}\min(|PGT|, |AGT|)_{max}$$

where $|PGT|, |AGT|$ are the respective durations of the guard times PGT and AGT. Thus, it is ensured that the guard times during a possible communication between the same nodes during the timeslot $A^{i+1}$ are in fact respected.

According to another variant, the synchronisation offset $\delta^i$, measured during a timeslot, $A^i$, is compared with the forecast value $\hat{\delta}^i$. If the difference between the measured value and the forecast value exceeds a certain threshold, i.e. $|\delta^i - \hat{\delta}^i| > \varepsilon$, the parameters of the forecasting model may be updated (in other words the model may be adaptive).

In the embodiments previously described, we have assumed that all of the synchronisation offsets measured by a node in communication were stored in the same stack, independently of the node with which it is in communication. According to one variant, the offset values measured may be labelled by the identifiers of the nodes with which the communication was established. More specifically, if the node $N_1$ is considered and its neighbour nodes are noted $N_1^j = 1, \ldots, J$, the node $N_1$ may manage up to J distinct stacks, each stack $j=1, \ldots, J$ being dedicated to the storage of synchronisation offsets, $\delta^{i-k^j_{N-1}}, \ldots, \delta^{i-k^j_2}, \delta^{i-k^j_1}$ of the local clock of the node $N_i$ in relation to the clock of the node $N_1^j$. It is understood that the correction applied to the local clock, will then depend on the node with which the communication will be established.

Regardless of the variant considered, the catch-up factor may be determined by means of a multi-agent reinforcement learning (MARL) method. It is reminded that a reinforcement learning method is an automatic learning method wherein an autonomous agent, immersed in an environment, learns actions to carry out from experiences, so as to optimise a reward accumulated over time. The agent makes decisions depending on its current state and the environment provides it with rewards depending on the actions that it carries out. When the learning method is furthermore of the multi-agent type, each node plays the role of an agent and learns from its environment, in this case the network, the various agents operating in a cooperative manner.

More specifically, during a timeslot, $A^i$, each node in communication is in a state $S_i$ (offset of its local clock in relation to a reference time). It carries out an estimation of the synchronisation offset and estimates the correction, $\eta_k \hat{\delta}^{i+1}$, to be applied during the following access slot where $\eta_k$ belongs to a predetermined set of catch-up factor values.

Following an action, in this case following the application of the correction of the local clock by the node, its environment (the network), returns to it a new state (corresponding to a new offset of the local clock) as well as a reward (positive or negative) that is shared by all of the nodes of the network. Thus, each node independently learns the catch-up factor that it must apply to maximise the mathematical expectation of the sum of future rewards, weighted by their respective discount factors. A description of reinforcement learning methods may be found in the work of Richard S. Sutton and Andrew G. Barto entitled "Reinforcement learning", $2^{nd}$ edition, 2018, pp. 129-132.

Figure 5:
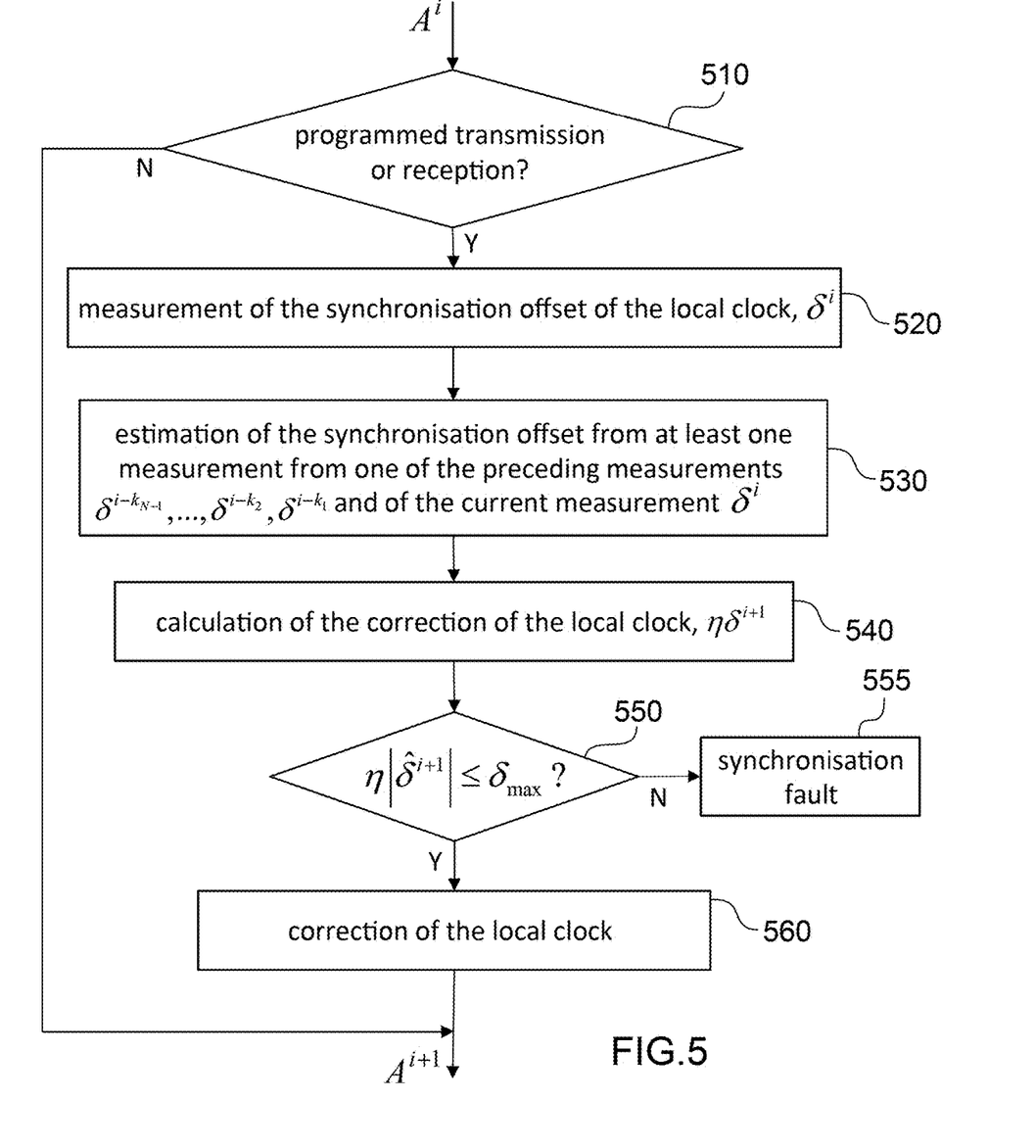
FIG. 5 schematically shows a flowchart of the method for synchronising a node in a deterministic mesh network, according to one embodiment of the invention.

FIG. 5 shows a flowchart of the method for synchronising a node in a deterministic mesh network, according to one embodiment of the invention.

The synchronisation method is based on a periodic process, repeating at each timeslot.

Consequently, we will consider the access slot, $A^i$.

In step 510, the node determines if it is programmed to transmit a packet to a neighbour node or to receive a packet from a neighbour node during the timeslot, $A^i$, from the scheduling matrix.

If this is not the case, the node waits for the next timeslot, $A^{i+1}$.

On the other hand, if a communication is established in transmission or in reception with a neighbour node during the timeslot, $A^i$, the node measures in 520 the synchronisation offset, $\delta^i$, of the local clock with the neighbour node from the detection of an event. When the node is receiver, the measurement of the offset, $\delta_1^i$, is obtained by detection of the time at which it receives the packet from the neighbour node and more specifically its start frame delimiter, SFD. On the other hand, when the node is transmitter, the measurement of the offset $\delta_i^2$ is obtained by detection of the reception time of the acknowledgement of the packet in question.

When the receipt of the packet (respectively of the acknowledgement) occurs outside of an authorised guard time (PGT for the packet, AGT for the acknowledgement in the case of a TSCH access mode), the synchronisation offset is not taken into account for the correction (step not shown). In an equivalent manner, when the synchronisation offset is greater than a (first) predetermined threshold value, it is not taken into account for the synchronisation correction.

In step 530, the node estimates, from at least one synchronisation offset measurement the, future synchronisation offset, $\hat{\delta}^{i+1}$, of its local clock for the following timeslot, $A^{i+1}$.

Preferably, this estimation, $\hat{\delta}^{i+1}$, is performed from a plurality of previous synchronisation offset measuements, $\delta^{i-k_{N-1}}, \ldots, \delta^{i-k_2}, \delta^{i-k_1}$, obtained during timeslots $A^{i-k_{N-1}}$, $A^{i-k_2}, A^{i-k_1}$, as well as of the synchronisation offset measurement, $\delta^i$ relating to the current timeslot, $A^i$.

The estimation, $\hat{\delta}^{i+1}$, may be obtained for example by means of a linear regression.

In step 540, the node calculates a correction of its local clock, that is to say advances or delays (according to the sign of $\hat{\delta}^{i|1}$) its local clock by a time $\eta|\hat{\delta}^{i+1}|$, with $0<\eta \leq 1/2$.

In optional step 550, it is determined if the correction is below a second threshold value, i.e. $\eta|\hat{\delta}^{i+1}| \leq \delta_{max}$. If this is the case, we can continue to step 560. Otherwise, the node notes a case of synchronisation fault in 555 and may for example adapt the parameters of its autoregressive model.

In step 560, the node corrects its local clock by the amount of the correction. More specifically, if $\hat{\delta}^{i+1}$ is positive, that is to say if the reception time measured with the local clock arrived later than expected, the clock is advanced and vice versa if $\hat{\delta}^{i|1}$ is negative, that is to say if the reception time measured with the local clock arrived earlier than expected, the local clock is delayed by $\eta|\hat{\delta}^{i+1}|$.

This correction occurs before the start of the following access slot, $A^{i+1}$, and, in any case, before any new communication of the node programmed in the scheduling matrix.

The process continues with the new access slot, $A^{i+1}$.

The invention claimed is:

1. A method for synchronising a node in a deterministic mesh network, comprising:
   programming the access of the nodes of the network to the transmission medium according to a slotframe split into timeslots, said node being able to communicate with its neighbour nodes during timeslots of the slotframe by using transmission resources, said node being provided with a local clock; and
   measuring the synchronisation offsets of the local clock of said node in relation to the local clock of at least one neighbour node by detecting a reception event of a packet transmitted by the at least one neighbour node or an acknowledgement of a packet transmitted by said node to the at least one neighbour node,
   wherein said node estimates, from at least one synchronisation offset thus measured, a future synchronisation offset of its local clock for a timeslot following the one for which the last measurement was carried out and corrects its local clock by a correction value equal to a fraction of the future synchronisation offset thus estimated,
   wherein the fraction is less than half of the estimated synchronisation offset.

2. The method for synchronising a node according to claim 1, wherein the synchronisation offset measured is not taken into account for the correction if it is greater than a first predetermined threshold value.

3. The method for synchronising a node according to claim 1, wherein when said correction value is greater in absolute value than a second predetermined threshold value, a synchronisation fault is signalled.

4. The method for synchronising a node according to claim 1, wherein the node estimates a future synchronisation offset of its local clock from a plurality N of synchronisation offsets, measured during past timeslots and the current timeslot, the node being in communication with one of its neighbour nodes during the past timeslots and the current timeslot.

5. The method for synchronising a node according to claim 4, wherein the node estimates the future synchronisation offset by carrying out a linear regression on the N synchronisation offsets, measured during past timeslots and the current timeslot.

6. The method for synchronising a node according to claim 4, wherein the node records in a FIFO stack the (N-t) synchronisation offsets measured during past timeslots, independently of the neighbour node with which said communication was established.

7. The method for synchronising a node according to claim 4, wherein the node records in a plurality of FIFO stacks the synchronisation offsets measured during past timeslots, each stack being associated with a neighbour node and only storing the synchronisation offsets in relation to the neighbour node with which it is associated.

8. The method for synchronising a node according to claim 1, wherein the fraction of the estimated synchronisation offset is obtained by means of multi-agent reinforcement learning, each agent being associated with a node of the network.

9. The method for synchronising a node according to claim 1, wherein the network of nodes possesses a physical layer in accordance with the standard IEEE 802.15.4, a data link layer in accordance with the standard IEEE 802.15.4e, the access control of the nodes to the transmission medium being performed in TSCH mode.

* * * * *